Feb. 6, 1945.  A. G. B. METCALF  2,368,67

RECORDING AND CONTROLLING VEHICLE MOTION

Filed March 16, 1940  6 Sheets-Sheet 4

UNITED STATES PATENT OFFICE 2,368,673

RECORDING AND CONTROLLING VEHICLE MOTION

Arthur G. B. Metcalf, Milton, Mass.

Application March 16, 1940, Serial No. 324,339

5 Claims. (Cl. 234—26)

My invention relates to a method of and apparatus for detecting, and recording or effecting a control response related to, motion which a vehicle, for example an airplane or similar object in motion, may have.

One of the objects of my invention is to effect a control response which bears a relation, not necessarily linear, to the instantaneous value of the angular velocity-time function referred to any selected axis or axes or its mathematical time-integrals or time-derivatives, such as the angular acceleration.

Other objects of the invention are detecting the variation with time of the angular velocity above a given axis of a vehicle by means of a precessing gyroscope, detecting the variation with time of the angular acceleration about a given axis of a vehicle by means of a torsional seismic element and recording such variations or using them to control damping moments or forces suppressing undesirable motion of an airplane, apart from course or directional control, such stabilizing control being combined with, or superimposed upon, the conventional manual or automatic course control.

Another object of my invention is to provide a self-contained portable device capable of recording on a film an amplitude-time record of the angular velocity of a vehicle such as an airplane.

A further object of the invention is to provide a method and an instrument for recording the motion of an airplane after disturbances, in a manner which provides, in the form of an oscillogram, the values of the period and the damping coefficient characteristic of the motion as a means of studying the dynamical stability of the motion of airplanes or other vehicles.

Still another object of my invention is to provide a means of selecting and detecting simultaneously the variation with time, of a number of components of angular velocity or acceleration referred to any convenient system of reference axes.

Other features are especially suitable detecting, recording and control mechanism, an amplitude control for varying a torque or moment opposing the precessional motion of a gyroscope, a torsional seismic element arranged for the detection of angular accelerations and for applying them to recording and control mechanism, and arrangements for simultaneously applying to an airplane, on the one hand, restoring or damping moments which are related to the instantaneous value of angular velocity or acceleration and, on the other hand, effects proportionate to the average deviations from a set course, whether manually or automatically controlled. The invention also contemplates the simultaneous detecting and recording of airplane angular velocity or acceleration about all three axes, and automatic flight stabilizing control with arrangements analogous to those for recording the flight characteristics.

These and other objects, aspects and features of the invention will be apparent from the description of a practical embodiment of the invention illustrating its genus by way of example and referring to drawings in which:

Fig. 18 is a circuit diagram of apparatus according to Fig. 7;

Fig. 19 is a diagram showing a hydraulic airplane control arrangement incorporating the invention;

Fig. 19ª is a diagrammatical development of a control valve port;

Assuming, for example, that an airplane is the type of vehicle being considered. An airplane in flight is continually disturbed by (1) relative motion of air masses in the air through which it flies, (2) lack of homogeneity in the structure of the atmosphere, and (3) variation in control setting or in propeller thrust. The airplane, therefore, is continually executing that motion which is consistent with equilibrium under the influence of the above operative disturbance factors. This resulting motion will be designated as the airplane motion or simply as the motion. The present invention is concerned with the recording of, or effecting control response in accordance with, this motion.

Figure 1:
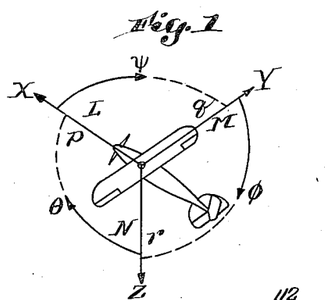
Fig. 1 is a scheme of the axes conventions herein used.
Figure 1B:
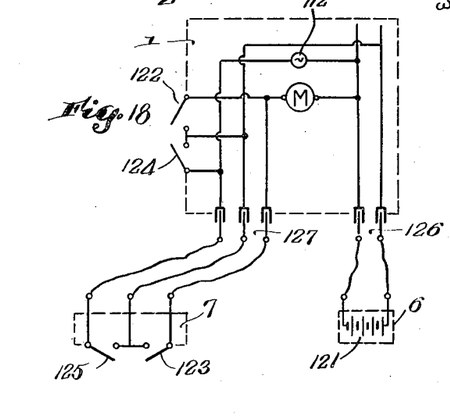

A consideration of airplane stability necessitates the establishment of conventions, both with respect to axes and symbols, in order to set up the equations of motion, as for example set forth in my paper "Airplane longitudinal stability," Journal of the Aeronautical Sciences, vol. 4, pp. 61–69, Dec. 1936. The system herein used will be that adopted as standard by the National Advisory Committee for Aeronautics and used in the above-mentioned paper, as indicated in Fig. 1.

The airplane in flight has six degrees of freedom, namely, a displacement and a rotation along or about, respectively, each of the three axes of reference, X, Y and Z. For small values of any of these components, the longitudinal or symmetric motion which involves a displacement in X, a displacement in Z, and a rotation about Y may be considered apart from the lateral or asymmetric motion which involves a displacement in Y, a rotation about X, and a rotation about Z. Independence of these sets of components of motion greatly simplifies the study of the longitudinal and lateral stability characteristics of the airplane. The axes of reference are assumed to be fixed in the airplane and to move with it.

Figure 3:
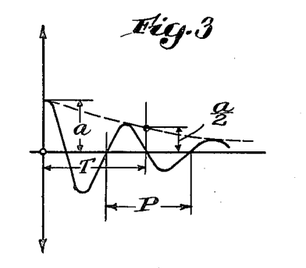
Figs. 3, 3ª, 4 and 5 are diagrams illustrating various types of airplane motion.
Figure 3A:
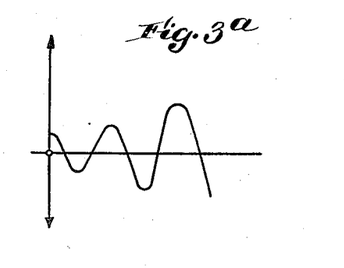
Figure 4:
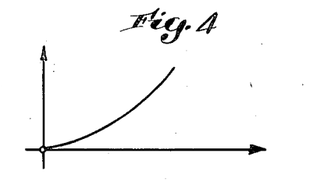
Figure 5:
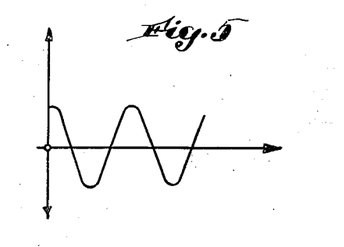

The magnitude of the angular velocity components about these axes and the variation with time of the components of angular velocity about these axes may be used as an index of the stability of the airplane motion both longitudinal and lateral. Such amplitude-time angular velocity records will, for stable motion, have the character of a damped oscillation or wave form (Fig. 3). For unstable airplane motion, the record will be either a simple divergence wherein the record simply departs from its equilibrium value (Fig. 4), or increasing oscillation in which, although the angular velocity value oscillates about an equilibrium value, its amplitude increases with time (Fig. 3ª). In the unique case of neutral stability, the amplitude will remain constant with time (Fig. 5). The stability of the airplane motion may be rated numerically by the valuation of certain mathematical constants related to the oscillograms just discussed. In particular, such constants are the period of the oscillation P, the time T to damp a disturbance to ½ amplitude and the damping coefficient K in the envelope equation $a = Ce^{KT}$ (Fig. 3).

The characteristics of the airplane motion will now be explained with reference to Fig. 2 which diagrammatically illustrates the character of such a motion during and following a disturbance, for example a disturbance inducing yawing oscillation about the Z axis; it will be understood that pitching disturbances about axis Y and rolling disturbances about axis X may take place in an analogous manner.

Figure 2:
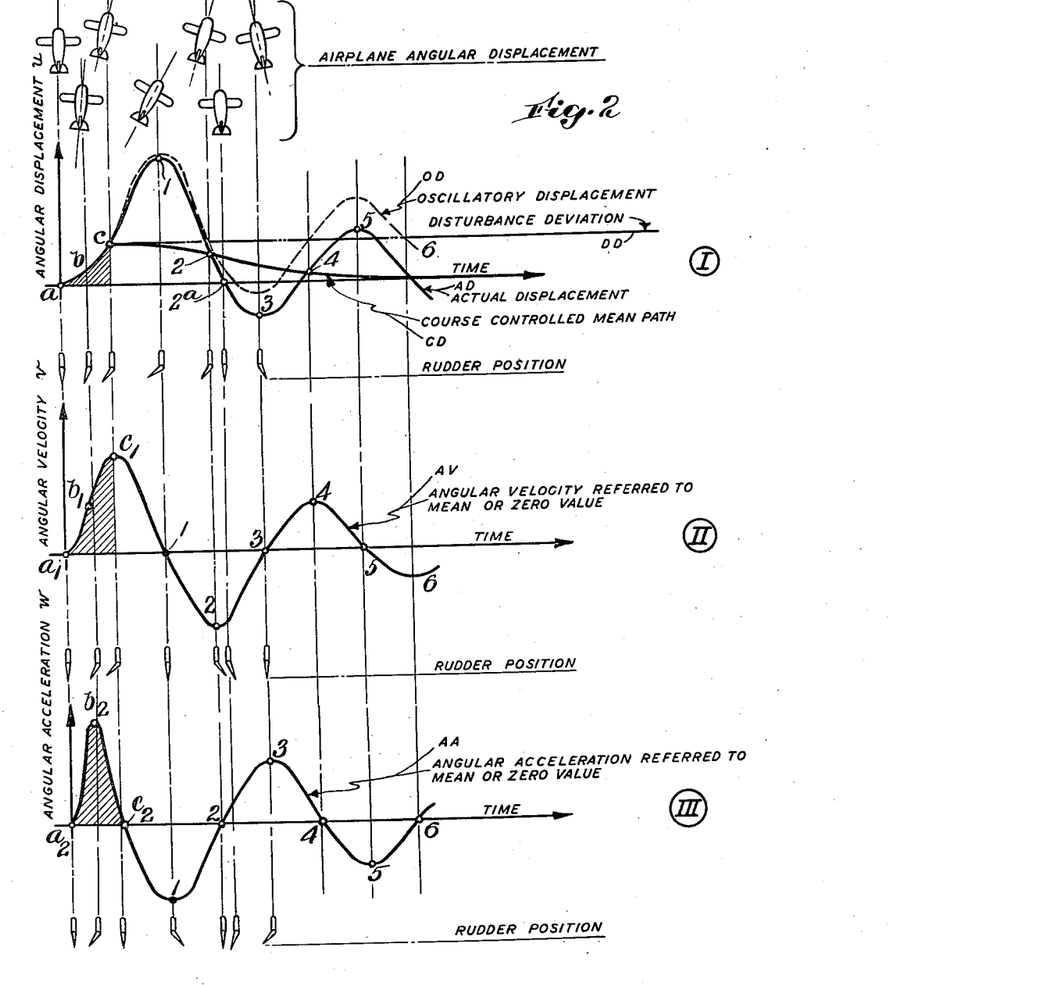
Fig. 2 shows displacement-time; velocity-time; and acceleration-time characteristics of the disturbed airplane motion.

In Fig. 2 diagram I records the angular displacement with reference to a set course. During undisturbed flight along a straight course, the angular displacement $u$ is zero as indicated at $a$. The airplane is disturbed at $a$, which disturbance is sufficient to build up, during a transient time period $a_1$—$b_1$—$c_1$ in diagram II an angular velocity of amplitude $c_1$. From this point in diagram I the airplane will swing far beyond the angular displacement $c$, until it reaches point 1 where a maximum displacement is reached. From this point, the airplane swings in opposite direction until, at 2, it swings through a point where the displacement is zero relatively to the disturbed path leading back into the set course, although not yet zero regarding the latter through which the airplane passes at 2ª, and so on until the set course is approached near 6. It will now be evident that, without any course control, the airplane would swing with displacements indicated at OD, about a path conforming to disturbance angular deviation $c$ indicated at DD in Fig. 2, and eventually continue along that new course at angle $c$ to the original course; that the conventional course control or automatic pilot gradually diminishes angle $c$ to zero in conformity with the ordinates of CD, as the airplane is led back into its original course along the mean path CD of the course control deviation; and that the actual instantaneous values of the angular position will be given by the ordinates of curve AD. At the top of Fig. 2 the corresponding airplane positions are shown, and below diagram I the rudder positions effected by the conventional course control which gives a control surface displacement proportional to angular displacement of the airplane. It should be noted that, in accordance with the nature of the latter, the control is applied to the greatest extent when the angular displacement is maximum but when the angular velocity is zero; and conversely the opposing control setting is zero when the displacement is zero, but when the angular velocity is a maximum.

The present invention is concerned with automatic stabilization control the function of which is to damp the oscillatory motion as rapidly as possible. It is a requirement of such an arrangement that it be so designed as to dissipate a maximum amount of energy from the oscillatory system. Any scheme which exerts a maximum opposing torque when the airplane kinetic energy is zero and exerts zero opposing torque when the airplane kinetic energy is maximum is clearly not designed to be of value in damping the motion or as a stabilizing agent. The conventional automatic pilot which exerts an opposing torque proportionate to angular displacement alone is such a device.

It may be stated that a torque best suited for damping the oscillation is not properly proportionate in value to, or in phase with, the actual displacement, but must be related to the motion in such a manner as to dissipate a maximum amount of kinetic energy. The characteristics controlling the optimum damping torque function must, therefore, be derived not from the actual angular displacement or course deviation function, but from its derivatives, namely the angular velocity or angular acceleration. Although the shape of the displacement oscillogram theoretically contains these derivatives, it is practically not feasible to utilize that oscillogram for an effective damping control, when the oscillation is initiated and any instrumentalities setting airplane control surfaces in dependency on the displacement or course deviation may be less than useless as a stabilizing agent. In accordance with the invention, the values of control responses best adapted to introduce effective damping torques are controlled by instrumentalities directly detecting displacement gradients, namely angular velocities or angular accelerations.

It should be emphasized that the motion detected according to the invention and recorded, or applied for controlling the airplane flight, is not to be confused with the above-mentioned deviation from a set course, and that angular displacement values (as for example detected by means of free gyroscopes) can not be used effectively to govern the value of torques counteracting oscillations about a mean path. A torque adapted successfully to dampen the oscillation must be derived not from the momentary displacement value but from the momentary rate of change of the displacement, that is from the velocity or its derivative the acceleration; in accordance with the invention, these rates or gradients of displacement rather than the displacements themselves are directly detected for purposes of recordation or control response.

Referring again to Fig. 2, the first derivative of the deviation, namely the angular velocity is indicated at II, and the second derivative, namely the acceleration at III. The corresponding control surface positions are indicated for I, II and III and it will now be evident that the control surface positions proportionate to the momentary velocity and acceleration values II and III and effective for damping oscillations are quite different from those proportionate to the angular displacement values I.

Generally speaking, if L, M and N are the damping torques about axes X, Y, Z (see also Fig. 1), and $p$, $q$, $r$ the angular velocities about these axes, the important applied damping torques rates or stability derivatives will be $$L_p \quad L_r$$
$$M_q$$
$$N_p \quad N_r$$

where $$L_p = \frac{dL}{d_p}$$

etc. Similarly, second derivatives of importance will be $L_{a_p}$, $L_{a_r}$, $M_{a_q}$, $N_{a_p}$ and $N_{a_r}$ where $$L_{a_p} = \frac{dL}{d_{a_p}}$$

etc. and $$a_p = \frac{\partial_p}{\partial_t}$$

is the angular acceleration about axis X.

In accordance with the invention, the variation with time of the angular velocity component is recorded, or employed for control purposes, by deriving working torque values proportionate to the prevailing angular velocity from the precession of a gyroscope having one degree of freedom and arranged so as to precess against a restoring torque.

In accordance with the invention, the variation with time of the angular acceleration is recorded, or employed for control purposes, by deriving working torque values proportionate to the prevailing angular acceleration from the angular displacement of a torsional seismic element as herein set forth.

Figure 6:
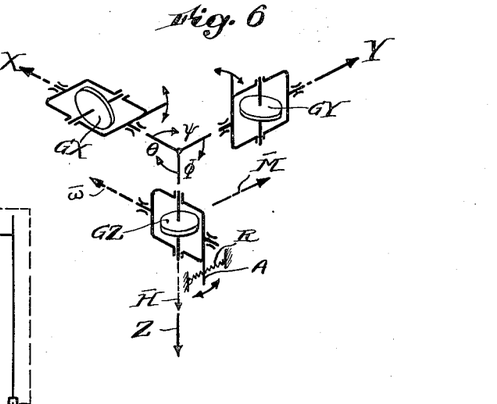
Fig. 6 is a diagram illustrating the arrangement, according to the invention, of gyroscopic detectors referred to axes conventions of Fig. 1.

Referring first to arrangements dealing with angular velocity values, and assuming that in a system of reference similar to that given in Fig. 1 a gyroscope rotates with momentum H about axis Z, that a torque $\overline{M}$ is applied about axis Y, and that the gyroscope is mounted in such a manner that precession takes place with angular velocity $\overline{\omega}$ about axis X (compare gyro GZ of Fig. 6, for which these values are indicated). Employing the vector notation, the following relation exists:

$$\overline{\omega} = \frac{\overline{H} \times \overline{M}}{H^2}$$

If only magnitudes are considered without regard to directions, the above relation changes into the scalar equation $$\omega = \frac{M}{H}$$

from which follows the well-known fact that a working torque corresponding to the disturbance amplitude (proportional to M) can be derived from the precession torque (proportional to $\omega$) of a gyroscope (with constant momentum H).

According to the invention, a gyroscope driven with momentum H is arranged with its axis of rotation parallel to one of the axes of the vehicle system to be supervised, and this gyroscope is mounted for precession about an axis parallel to a second axis, against a restoring torque; angular velocities of the airplane about the third axis will then be proportionate to the precessional displacement of the gyroscope.

Referring to Fig. 6, gyro GZ rotates about axis Z and is permitted to precess about axis X against a restoring torque exerted by springs R; the angular deflection of arm A therefore indicates the angular velocity about axis Y which in an airplane related to the axis system as indicated in Fig. 1 correspond, as pointed out above, to oscillations characteristic of the longitudinal motion. A gyroscope arranged as indicated at GX of Fig. 6 will analogously detect yawing velocity about axis Z, characteristic of directional and lateral or asymmetric stability. Finally, a gyro GY will detect rolling velocity about axis X.

If it is desired to study the airplane motion, arm A is connected with a device permitting the recordation of oscillograms similar for example to Fig. 3, from which the characteristic values T, P and K can be derived. If, on the other hand, the airplane motion is to be automatically damped, the detecting gyros are connected to suitable airplane controls.

A preferred embodiment of a detecting and recording unit, as for example schematically shown at GZ of Fig. 6 and explained above with reference to that figure, will now be described in detail.

Figure 7:
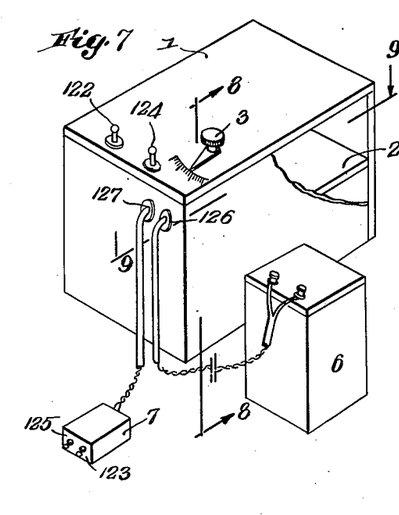
Fig. 7 is an isometric view of a detector and recording instrument according to the invention.

Fig. 7 shows the three main parts of a unit, namely, the detector proper in a housing 1 with partition 2, control knob 3, and switches 122 and 124, a battery 6, and a remote control switch box 7 with switches 123 and 125. The electric connections between these devices will be described later with reference to Fig. 18. Housing 1 also has an air vent 10.

Above partition 2 are mounted (Figs. 8 and 9) gyroscope G, with precession transmitter P, recorder R, restoring torque device D, light source S and film gear F. Below partition 2 are arranged driving motor M, transmission T with flywheel W, and air pump Q with air pressure conduit C leading through partition 2 to gyro G.

Figure 8:
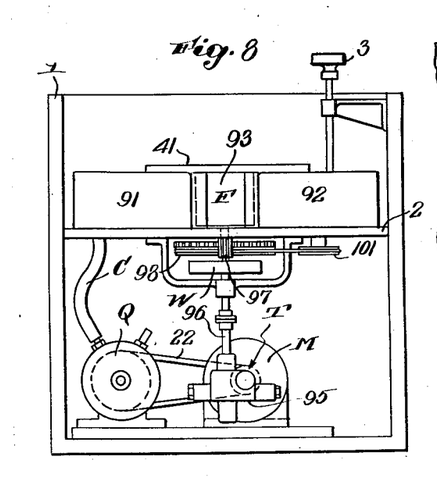
Fig. 8 is a section on line 8—8 of Fig. 7.
Figure 9:
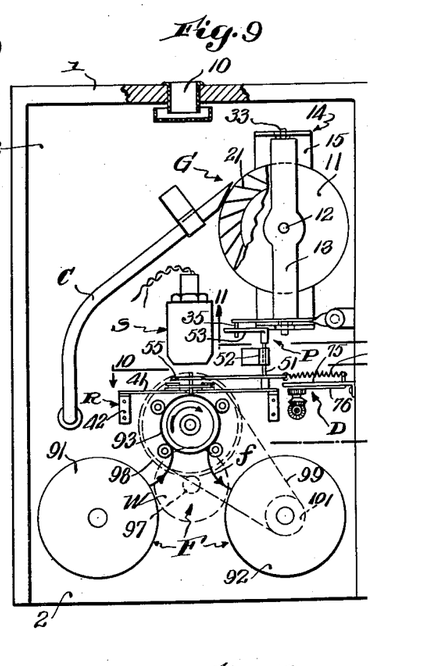
Fig. 9 is a section on line 9—9 of Fig. 7.

Gyro G consists of a rotor 11 journaled at 12 in precession frame 13 which is again journaled at 14 in bracket 15 screwed to partition 2. The gyro rotor 11 is designed as a turbo wheel with blades 21 supplied through flexible tube C with compressed air from pump Q driven from motor M by means of belt 22.

Precession frame 13 has trunnions 33, to one of which (Fig. 11) is fastened a double armed lever 34 having on one end a pin 35 and on the other end a flat portion 36 which, together with screws 37 and 38 fastened to housing 1, constitutes a stop device for limiting the precession movement of frame 13.

Figure 14:
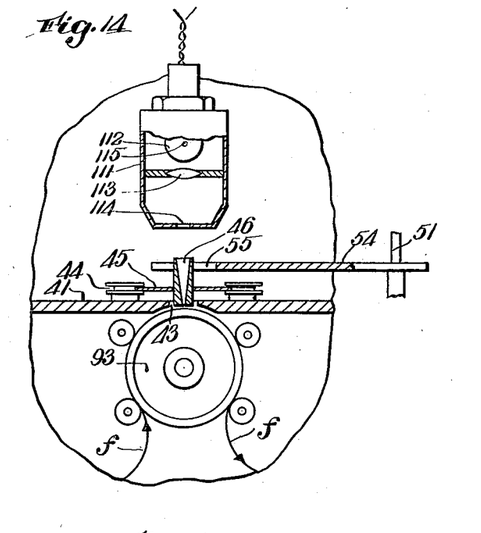
Fig. 14 is a detail, partly in section, of the recording device shown in Fig. 9.

The recording device R has (Figs. 9, 10 and 14) a base plate 41 fastened to partition 2 with brackets 42 and is provided with a transverse slot 43. On plate 41 are rotatably mounted four flanged guides 44 carrying a scanning strip 45 with scanning tube 46 (Fig. 14).

In order to transmit the precession from the gyroscope to the scanning strip, a shaft 51 is provided which is at 52 journaled on partition 2. To one end of shaft 51 is fastened a small fork 53 engaging pin 35 of lever 34 (Fig. 11), whereas the other end of shaft 51 carries a double armed lever 54 with fork 55 (Figs. 14 and 15) engaging scanning tube 46.

Figure 11:
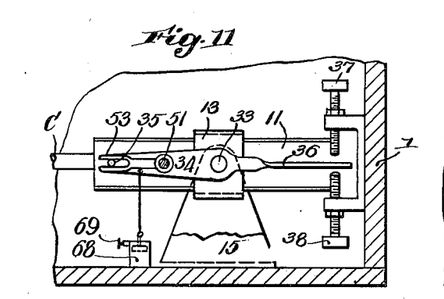
Fig. 11 is a sectional view on line 11—11 of Fig. 9.
Figure 12:
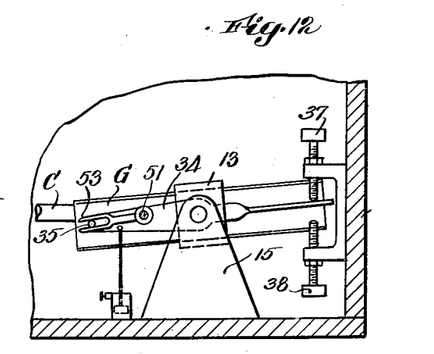
Fig. 12 is a view similar to Fig. 11 but with the recording lever displaced.
Figure 15:
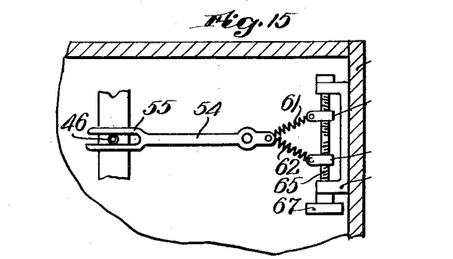
Fig. 15 shows a modification of the amplitude adjustment device shown in Fig. 10.

The second arm of lever 54 is fastened to restoring springs 61, 62 which, as shown in Fig. 15, may be carried on the nuts 63, 64 of a screw 65 turning on a bracket 66 fastened to housing 1 and having a right-hand and a left-hand thread and a thumb knob 67. Rotation of the latter adjusts the distance of nuts 63, 64, and hence the tension of the restoring springs. The motion of lever 34 is damped by dashpot 68 with adjusting screw 69 (Fig. 11).

Figure 10:
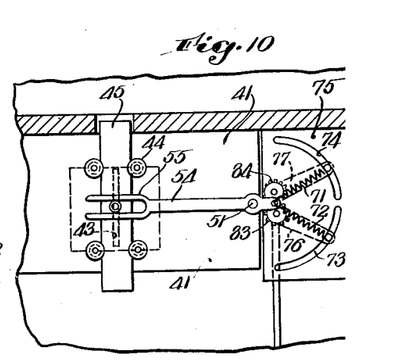
Fig. 10 is a section on line 10—10 of Fig. 9.
Figure 13:
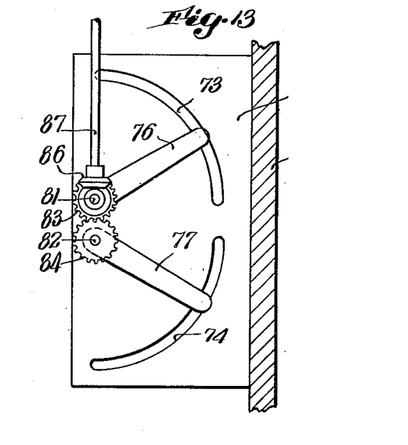
Fig. 13 is a section on line 13—13 of Fig. 9.

Instead of the above simple restoring device a more elaborate one may be used which is shown in Figs. 9, 10 and 13. This device has likewise two restoring springs 71, 72 which, however, move with their free ends by means of two arms 76, 77 (Fig. 13) in arcuate slots 73, 74 of a guide plate 75 fastened to housing 1. Arms 76, 77 are journaled in plate 85 at 81, 82 and connected to two meshing gear wheels 83, 84, respectively, one of which carries a bevel gear wheel 85 meshing with gear 86 on a shaft 87 leading to control knob 3 outside of housing 1 (Fig. 7). By rotating knob 3, springs 71, 72 can be moved in their respective slots.

Figure 16:
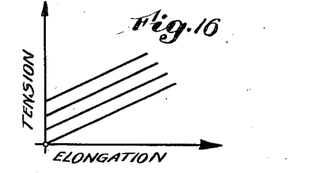
Figs. 16 and 17 are diagrams illustrating the operation of amplitude adjustment devices according to Figs. 15 and 10, respectively.
Figure 17:
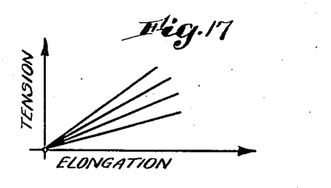

The devices shown in Figs. 10 and 15 permit adjustment of the restoring torque for the purpose of changing the sensitivity of the mechanism for detecting angular velocity and for varying the amplitude of the film record or the magnitude of airplane control response. These devices provide a means of varying the force-deflection characteristics of the springs for the stated purpose without resorting to repeatedly changing the springs for those of slightly different characteristics. This is done by arranging the springs so that they may be rotated fanwise with respect to the precessing lever 54 and thus vary the component of spring force perpendicular to the lever 54. In this way the torque opposing the precessional motion may be increased or decreased and the precessional amplitude correspondingly affected. Fig. 15 indicates a means of accomplishing this. However, with this arrangement not only is the spring angle changed but the initial tension is likewise changed as indicated in Fig. 16 which is the well-known relation between spring tension and elongation. It is of interest to note that since the characteristic of a spring is expressed by the slope of the plot of Fig. 16, that merely changing the tension of a spring will not give the effect of using a spring of different characteristic as the slope remains unchanged. Only the initial tension value is altered. Although the simple arrangement of Fig. 15 is often satisfactory, it is preferable to maintain the same initial spring tension for all amplitude adjustments. The device according to Figs. 10 and 13 accomplishes this since obviously different angular positions of springs 71 and 72 will not change their initial tension. The effect of this adjusting device is illustrated in Fig. 17, where the fanwise spread of spring characteristics indicates that the initial tension is always the same.

A photographic film strip, preferably of the common 35 mm. motion picture type, can be carried past scanning tube 46 at uniform speed, by means of the following arrangement. The film f is supplied from, and received on reels 91 and 92, respectively, and guided past slot 43 of plate 41 by means of a conventional film sprocket 93 (Figs. 9 and 14). As shown in Figs. 8 and 9, reel 92 and sprocket 93 derive their motion from motor M by means of worm drive 95 and shaft 96, film sprocket 93 being driven from sprocket 97 on shaft 96, through geared pulley 98 meshing with sprocket 97 and driving through belt 99 a pulley 101 fastened to reel 92.

The illuminating device S consists of a lamp housing 111 with tubular lamp 112, cylindrical lens 113 and slit diaphragm 114 (Fig. 14) which direct the light from straight wire filament 115 of lamp 112 through funnel-shaped scanning tube 46 towards film f on sprocket drum 93.

As shown in Fig. 18, motor M is driven from battery 121 in casing 6 and controlled by two switches 122 and 123 connected in parallel, one being mounted on housing 1 and the other on remote control box 7. Lamp 112 is similarly controlled by switches 124 and 125. As indicated in Figs. 7 and 18, battery and remote control leads are connected to the gyro housing by means of detachable plugs 126 and 127.

In order to make records with an instrument of the above-described type, box 1 is fastened in the airplane in proper alignment with the axes as explained with reference to Fig. 6. If it is desired to make simultaneously measurements relatively to two or three axes, two or three instruments will be used; it will be understood that two or three gyros can be mounted in a single housing and the respective curves recorded in a single film strip.

The battery and switch boxes having been connected according to Fig. 18, the gyro is started, preferably after the airplane is in the air. After the airplane is trimmed to an equilibrium condition, the recording light is turned on and left running for a short time in order to provide a datum line. The airplane is then disturbed in the manner desired; after its oscillation has completely dampened out, the recorder is again left running for a short time before the light is turned off.

The film strip is then removed and developed and provides an exact record of the angular velocity or velocities about the airplane axis for which the apparatus was orientated.

It is understood that different more elaborate recording means could be employed, as for example such similar to sound recording equipment; however, the above described recording device was found to be satisfactory for most purposes.

If, instead of actuating a recording mechanism, the above described detector of angular velocity values is to be employed for governing certain stabilizing or damping devices, as for example control surfaces of an airplane, an arrangement now to be described with reference to Figs. 19, 19a and 20 may be used.

Figures 19, 19A:
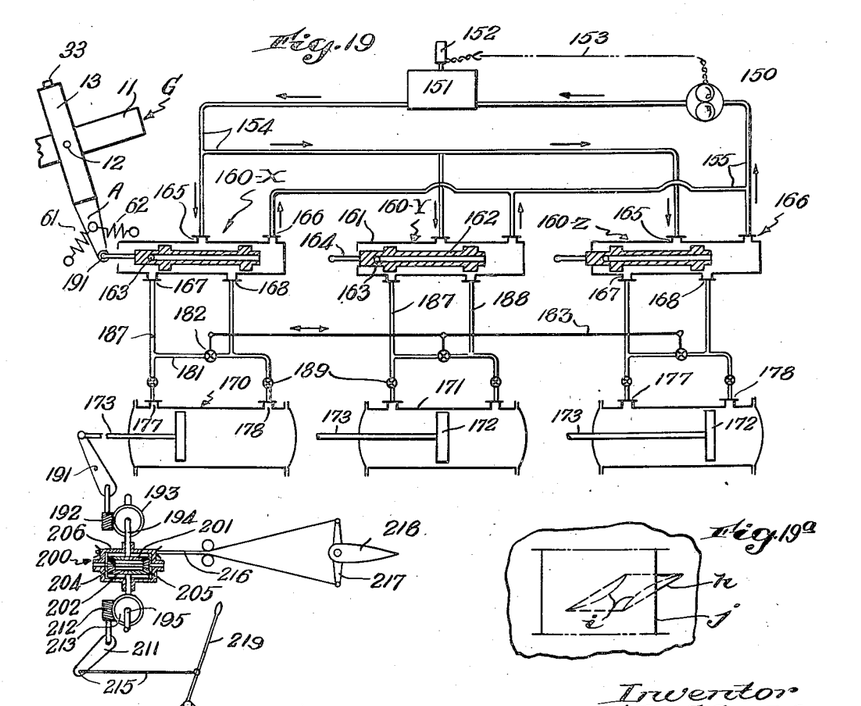

Fig. 19 shows a hydraulic control system with an oil pump 150, a pressure tank 151, a pressure gauge 152 controlling through a conventional electric connection 153 the drive of pump 150, a supply pipe line 154 and a return line 155. Each one of a series of conventional slide valves 160X, 160Y and 160Z consists of housing 161, hollow plunger 162 with port 163, connecting rod 164, and four ports 165 to 168. Ports 165 and 166 are connected to supply line 154 and return line 155, respectively. Ports 167 and 168 are connected to ports 177 and 178, respectively, of working cylinders 170 with housings 171, pistons 172, and connecting rods 173. The ducts 187, 188 between the valve and cylinder ports are connected through by-pass pipes 181 with cocks 182 connected by a linkage 183 for joint movement. Throttle valves 189 may be provided in connecting ducts 187, 188.

Arms A (compare Fig. 6) of precession frames 13 swinging on pivots 12 and at 14 supporting gyro rotors 13, are at 191 linked to connection rods 164 of valves 160. As above explained, the three gyros will be arranged in such a manner that each precession frame detects angular velocities about a different one of the three axes X, Y, Z.

Under normal conditions, when the angular velocity is zero, piston 162 closes the ports leading to the work cylinder, as shown for valve 160Y. If a gyro detects a positive or negative angular velocity, connection rod 164 and cylinder 162 will be moved in one direction or the other. Considering for example valve 160X, pressure oil will be admitted at 165, flow around the piston and through port 168, line 188 and cylinder port 178 into cylinder 171 moving piston 172 towards the left. Oil from the left-hand side of the cylinder passes through port 177, duct 187 and port 167, flows through piston port 163, the hollow piston and out through port 166 back into return line 155 and pump 150.

Through a suitable linkage indicated as crank 191, valve rod 173 rotates worm 192 which rotates worm wheel 193. A planetary gear 200 has two master gear wheels 201, 202 and two planet wheels 204, 205; the two planets are journaled in housing 206 which rotates on the master gear wheel shafts 194 and 195. Shaft 194 is keyed to worm wheel 193 and shaft 195 to a second worm wheel 213, meshing with worm 212 which is rotated for example from a crank 211 similar to crank 191, above, suitably connected at 215 to a conventional course control for example control column 219.

Planetary gear housing 206 carries a sprocket with chain drive 216 attached to the horns 217 of control surface 218.

By means of the arrangement above described by way of example, it is possible to add or subtract two control movements, namely the damping control movement initiated by gyroscopic device G and relayed through the hydraulic transmission with valves 160 and work cylinders 170, and the conventional pilot or course control from stick 219, which, of course, can be replaced by an automatic course control of well known type. It will from the above description be evident that equal movement of damping and course control members in the same sense will impart maximum movement to sprocket and chain 216, whereas equal movement in opposite directions will leave the planet gears stationary; any combination of unequal movements on either side of the superimposing device will provide correct algebraic addition of the control movements.

The worm drives 192, 193 and 212, 213 are inserted in order to provide undirectional transmission; without this precaution forces effective at the control surface might find their way back through the system and interfere with the controls.

If 218 is for example the rudder, valves 160Y and 160Z would similarly control elevator and ailerons, respectively.

It will be evident that it is not necessary to provide rudder, elevator and ailerons with automatic damping control by means of a set of three gyroscopes, three valves and three work cylinders, as above described; a quite satisfactory combination could for example include normal pilot control with interchangeable automatic course control for rudder and ailerons, together with automatic precession controlled damping of longitudinal oscillations superimposed on the manual elevator control.

Cocks 182 are closed when the automatic damping control is used; upon opening them the hydraulic circuit becomes short-circuited and the damping control inoperative. This is a necessary precaution since the pilot must at any moment be able to eliminate any controls except the manual control. Provisions may further be made for positioning work piston 172 in central position (as shown for cylinder 170Y) when the hydraulic control is eliminated, and for arresting them in that position by closing valves 189.

Valves 189 may also be used for adjusting the damping rates; by throttling the flow of oil from control valve to work cylinder, the travel of piston 172 can be reduced and with it the amplitude of the damping torque exerted by the respective control surface; this adjustment can be applied to all surfaces simultaneously, or separately and to different degrees to each individual surface.

While the discharge ports 167, 168 of valve cylinders 160 may have the, in its effect generally speaking conventional, shape shown at $h$ of Fig. 19a, providing a linear relation between the movement of the precession frame and that of the control surface, the metering edges of the ports may be shaped to provide a non-linear relation, as shown in Fig. 19a where $i$ is a curved metering port edge and $j$ the corresponding piston or slide edge; evidently by suitably correlating these edges and the kinematic characteristics of all mechanisms involved, any desired translation function can be obtained.

Instead of superimposing course and damping control movements upon a single control surface, the surfaces may be divided or auxiliary surfaces employed and the components separatively controlled. Such an arrangement is shown in Fig. 20 which will now be discussed.

Figure 20:
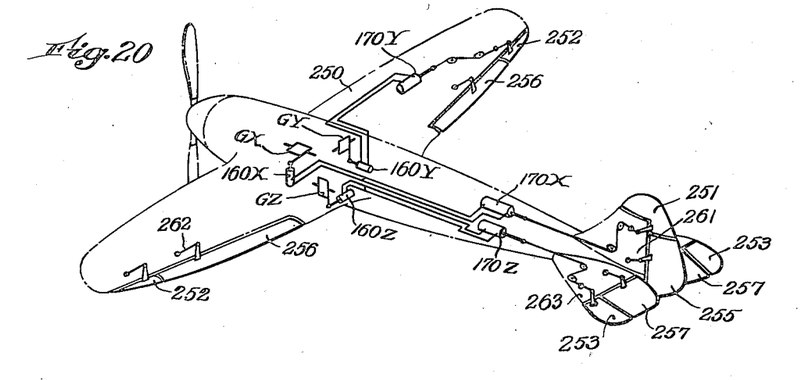
Fig. 20 is a diagram illustrating a control similar to that of Fig. 19 but with auxiliary control surfaces.

In Fig. 20 an airplane 250 is equipped with automatic gyroscope controlled damping devices indicated at GX, GY and GZ. The precession frames of these gyros are connected in the manner shown in Fig. 19 to control valves 160X, 160Y, 160Z which are again hydraulically connected to work cylinders 170X, 170Y and 170Z. By means of conventional linkages the pistons of working cylinders 170X, 170Y, 170Z are connected to damping rudder 251, damping ailerons 252 and damping elevators 253. Auxiliary damping control surfaces of an area of about 25% of the total control surface area will give satisfactory results. The course control surfaces 255, 256 and 257 are at 261, 262, 263 linked to manual or automatic controls (not shown) in conventional manner. With equipment of this type any special interlocking devices between course and damping controls are unnecessary; it is merely necessary to provide a simple device for disconnecting the automatic damping control and for fixating the damping surfaces in neutral position, converting them in this manner into ordinary fin surfaces.

Figures 21, 23, 24, 25:
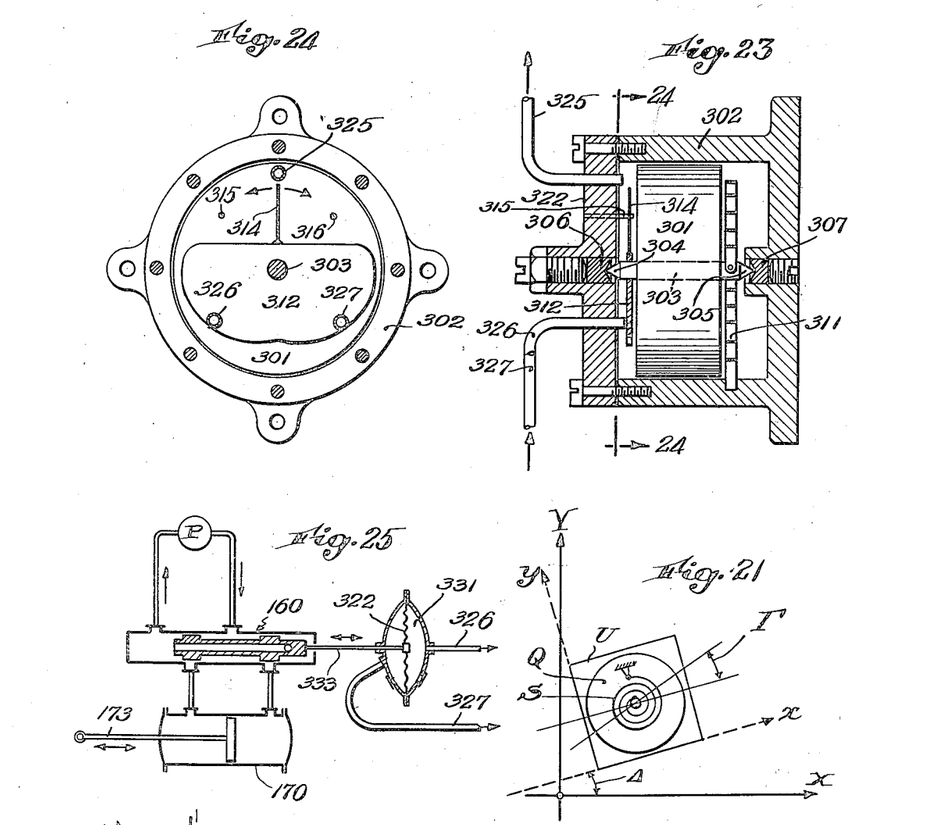
Fig. 21 is a diagram of acceleration detecting apparatus according to the invention.
Fig. 23 is a side view, with the housing in axial section, of apparatus according to Fig. 21.
Fig. 24 is a section on line 23—23 of Fig. 22.
Fig. 25 shows an arrangement similar to that of Fig. 19 but controlled by apparatus according to Fig. 22.

Referring now to arrangements dealing with the direct detection of acceleration values, there may be used for that purpose, according to the invention, a torsional seismic element. If a torsional seismic element be used as an indicator of the variation of angular acceleration of the foundation upon which it is placed (in this case an airplane) the following terms may be defined:

$\Delta_o$ = the angular amplitude through which the foundation oscillates.

$U$ = the system supporting the seismic element and resting upon the foundation whose characteristics are to be measured.

$\Gamma_o$ = the angular deflection amplitude of oscillation of the pivoted flywheel with respect to the system $U$.

$\omega$ = imposed angular velocity of the foundation (or airplane).

$\omega_n$ = "natural angular frequency" of the mass-spring combination in free oscillation in radians/second $$\left(\omega_n = \sqrt{\frac{I}{k}}\right)$$

Referring to Fig. 21, a comparatively heavy mass Q is arranged for practically frictionless rotation against a restricting torque represented by torsional spring S, I is the moment of inertia of mass Q, and $k$ the torsional stiffness of spring S in inch-lbs. per radian. Using the value of $\Gamma_o$ as a measure of the airsplane disturbance amplitude $\Delta_o$, the following equation describes the relation between these two terms:

$$\frac{\Gamma_o}{\Delta_o} = \frac{(\omega/\omega_n)^2}{1 - (\omega/\omega_n)^2}$$

Figure 22:
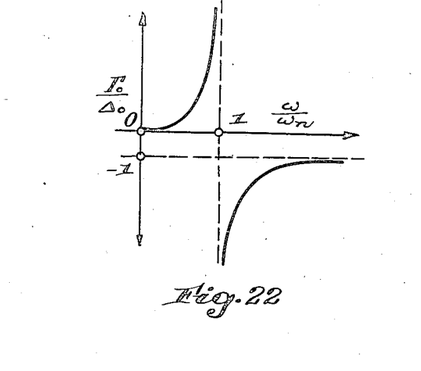
Fig. 22 is a diagram of the relation between airplane angular deflection amplitude and that indicated by the torsional seismic element shown in Fig. 21.

If ratio $\Gamma_o/\Delta_o$ is plotted against ratio $\omega/\omega_n$ a curve of the shape shown in Fig. 22 is obtained which indicates that for high $\omega/\omega_n$ values, that is for conditions where the imposed frequency $\omega$ is very much higher than the natural frequency $\omega_n$, the ratio of amplitudes $\Gamma_o$ and $\Delta_o$ is substantially unity so that $\Gamma_o$ will be a measure of $\Delta_o$. In other words, the rotation of mass Q relatively to its support U (for example an airplane body) can be used as an equivalent for the rotation of the airplane relatively to the instantaneously fixed system X, Y, Z. It is a fact that the disturbance amplitude $\Delta_o$ is directly proportional to the acceleration amplitude. Since, therefore $\Gamma_o$ is a measure of the angular acceleration between rotating mass and support, it is also a measure of the angular acceleration of the airplane just as the precessional angle in a system according to Fig. 6 is a measure of the angular velocity of the airplane relatively to its mean path.

The above condition that $\omega_n$ have a small value relatively to $\omega$ is fulfilled if a very soft spring S and a relatively large amount of inertia I are used.

Figs. 23 to 25 show a practical embodiment of such an arrangement. In Figs. 23 and 24, a heavy mass 301 is rotatably suspended within housing 302, by means of shaft 303 with pivot points 304 and 305 in jewel bearings 306, 307. A soft spiral spring 311 is with one end fastened to flywheel 301 and with the other to housing 302. Fixed to shaft 303 is a vane 312; a leaf spring 314 prevents excessive rotation by contacting one of pins 315 and 316 fastened to cover plate 322 of housing 302. Three tubes lead through cover plate 322, exhaust tube 325 being free of vane 312, whereas the tubes 326, 327 end very close to the adjacent surface of vane 312. Tube 325 is connected to a vacuum pump, whereas tubes 326 and 327 lead to opposite sides of diaphragm box or pneumatic relay 331 (Fig. 25). Diaphragm 332 is attached to connecting rod 333 of a valve 160 similar to those shown in Fig. 19 and controlling the piston movement of a work cylinder 170 in the manner above explained.

With vane 312 in normal position, as shown in Fig. 24, the air pressure will be equal on both sides of diaphragm 332 and valve 160 will be at rest. Any movement of wheel 301 will change the relative opening of tubes 326 and 327, deflecting diaphragm 332 and actuating control valve 160.

By attaching the piston rod 173 to a control gear of the type as for example shown in Figs. 19 and 20, damping torques derived from the angular acceleration values of the airplane relative to its mean course, can be superimposed on the pilot or course control torques.

It will be understood that arrangements different from those shown in Figs. 23 and 24 can be used, as long as they are suitable for directly detecting acceleration values. Also, the vacuum linkage between mass Q and control valve 160 is, of course, only an example of provisions suitable for the same purpose.

If it is desired to make records of acceleration values instead of employing them for controlling vehicle movements, apparatus of the type shown in Figs. 23 and 24 is connected to a recording device as for example shown in Fig. 14. Tie rod 333 (Fig. 25) will then be linked to slide 45 (Fig. 14); the operation of a recorder of this type is analogous to that described above for velocity recordation and therefore does not require detailed explanation.

It should be understood that the present disclosure is for the purpose of illustration only and that this invention includes all modifications and equivalents which fall within the scope of the appended claims.

I claim:

1. Apparatus for recording the motion of a vehicle about a selected one of its three characteristic axes comprising means, mounted on said vehicle, for directly detecting the continuously varying value of a time derivative of the component, about said selected axis, of said motion, means for moving record receiving material in a predetermined time relation, means for marking said material, means for continuously transmitting from said detecting means a working torque which is a function of said value, and means responding to said torque for moving said marking means relatively to said material.

2. In apparatus for recording the motion of a vehicle about a selected one of its three characteristic axes of rotation the combination of a precession frame mounted on said vehicle for rotation about one of said axes, a gyroscope mounted in said frame for rotation about a second axis, means applying to said frame a restoring torque, means for driving said gyroscope with substantially constant momentum, and means for continuously recording the precessional travel of said frame as a function of the instantaneous value angular velocity of the vehicle about the third axis.

3. In apparatus for recording the motion of a vehicle about a selected one of its three characteristic axes of rotation, the combination of a precession frame mounted on said vehicle for rotation about one of said axes, a gyroscope mounted in said frame for rotation about a second axis, means applying to said frame a restoring torque, means for driving said gyroscope with substantially constant momentum, a record receiving surface, and means adapted to move relatively to said surface for marking the movement of said frame on said surface, whereby a record of the angular velocity of the vehicle about the third axis can be obtained.

4. A restoring torque device for use with gyroscopic apparatus having a precession frame swinging on a support, comprising an arm attached to said frame, a base attached to said support, two levers having respective ends rotatably fastened to said base, two springs extending from the respective other ends of said levers to said arm and means for rotatory adjustment of said levers relatively to said base, said adjustment varying the gradient of the force exerted by said springs on said arm with deviation of said frame without substantially varying the value of said force at normal position of said frame.

5. In a restoring torque device for use with gyroscopic apparatus having a precession frame swinging on a support, two resilient spring-like members attached to said frame, extending to two spaced points of said support, and applying substantially equal forces to the frame in normal position, and adjusting means for oppositely rotating the support ends of said members about the respective frame ends thereof, said adjusting rotation varying the gradient of said forces exerted on said frame upon deviation of the frame, without substantially varying the value of said force at normal position of said frame.

ARTHUR G. B. METCALF.